United States Patent
Clark

(10) Patent No.: US 6,889,513 B1
(45) Date of Patent: May 10, 2005

(54) TEMPERATURE CONTROL SYSTEM FOR NITROUS OXIDE PRESSURIZED BOTTLE

(75) Inventor: Dennis S. Clark, Torrance, CA (US)

(73) Assignee: Clark Distribution Inc., Henderson, NV (US)

( * ) Notice: Subject to any disclaimer, the term of this patent is extended or adjusted under 35 U.S.C. 154(b) by 30 days.

(21) Appl. No.: 10/780,760

(22) Filed: Feb. 19, 2004

(51) Int. Cl.$^7$ .............................................. B60H 1/32
(52) U.S. Cl. ......................... 62/244; 62/3.2; 62/323.1; 123/541
(58) Field of Search ................... 62/244, 3.2, 3.3, 62/3.6, 3.61, 323.1; 123/1 A, 541, 552

(56) References Cited

U.S. PATENT DOCUMENTS

| | | | |
|---|---|---|---|
| 3,194,023 A | | 7/1965 | Sudmeier |
| 3,580,649 A | | 5/1971 | Araki et al. |
| 3,841,283 A | * | 10/1974 | Wood .......................... 123/676 |
| 4,328,676 A | | 5/1982 | Reed |
| 4,494,488 A | * | 1/1985 | Wheatley .................... 123/1 A |
| 4,572,140 A | | 2/1986 | Wheatley |
| 4,640,323 A | * | 2/1987 | Norcia et al. ................. 141/18 |
| 4,683,843 A | | 8/1987 | Norcia et al. |
| 4,726,193 A | | 2/1988 | Burke et al. |
| 4,823,554 A | | 4/1989 | Trachtenberg et al. |
| 4,872,424 A | * | 10/1989 | Carnes .................. 123/184.32 |
| 5,301,508 A | | 4/1994 | Kahl et al. |
| 5,400,746 A | * | 3/1995 | Susa et al. ................. 123/25 C |
| 5,860,281 A | * | 1/1999 | Coffee et al. ................. 62/3.62 |
| 5,967,099 A | * | 10/1999 | Patrick ....................... 123/1 A |
| 6,006,540 A | * | 12/1999 | Coletti ......................... 62/430 |
| 6,105,563 A | * | 8/2000 | Patrick ....................... 123/585 |
| 6,116,225 A | * | 9/2000 | Thomas et al. ............. 123/590 |
| 6,234,155 B1 | * | 5/2001 | Brothers et al. ............ 123/586 |
| 6,367,244 B1 | * | 4/2002 | Smith et al. .................. 60/251 |
| 6,433,316 B1 | | 8/2002 | Sigety et al. |
| 6,718,954 B2 | * | 4/2004 | Ryon .......................... 123/541 |

FOREIGN PATENT DOCUMENTS

DE           1359380 A2 * 11/2003

* cited by examiner

Primary Examiner—William E. Tapolcai
Assistant Examiner—Mohammad M. Ali
(74) Attorney, Agent, or Firm—Dennison, Schultz, Dougherty & MacDonald

(57) ABSTRACT

A temperature control system for maintaining a nitrous oxide pressurized bottle at a preselected temperature and pressure for injecting nitrous oxide into an engine is disclosed. The system includes a generally box shaped insulated container having a hinged cover. The nitrous oxide pressurized oxide bottle having an outer surface is disposed within the container and fixed in the bottom thereof. The system also includes a temperature sensor for sensing the temperature of the nitrous oxide bottle and a thermoelectric air conditioner for heating and cooling the pressurized bottle to maintain a preselected temperature and pressure.

15 Claims, 5 Drawing Sheets

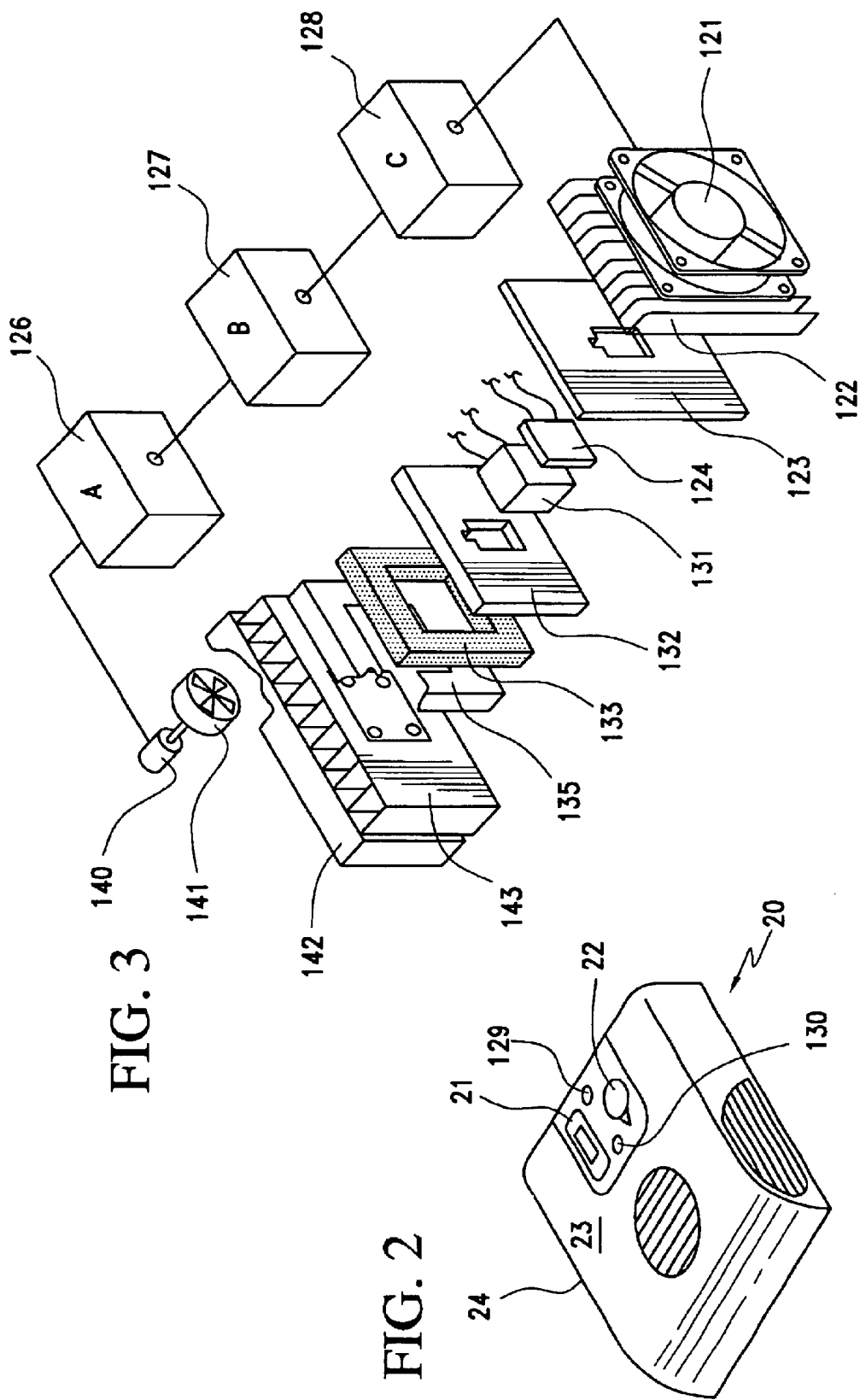

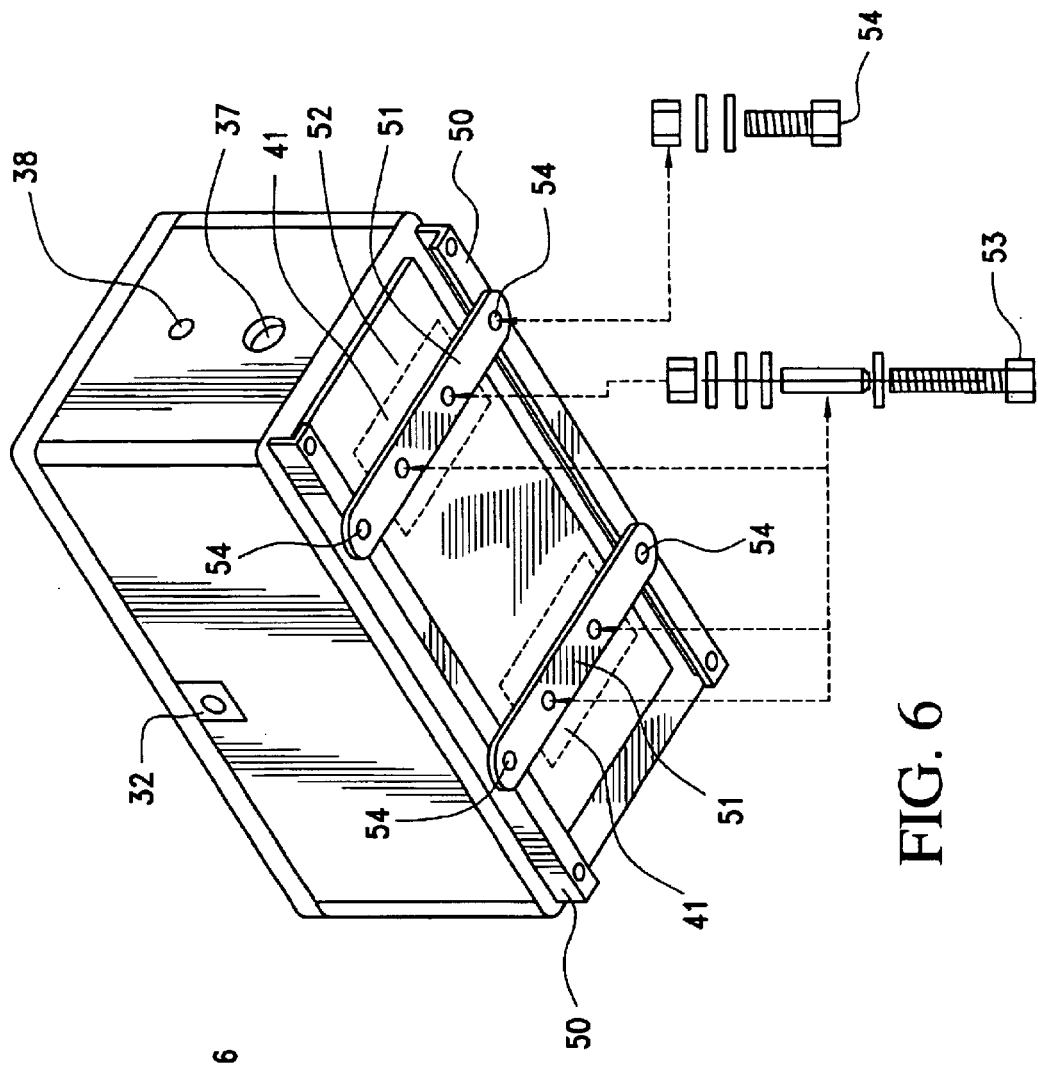
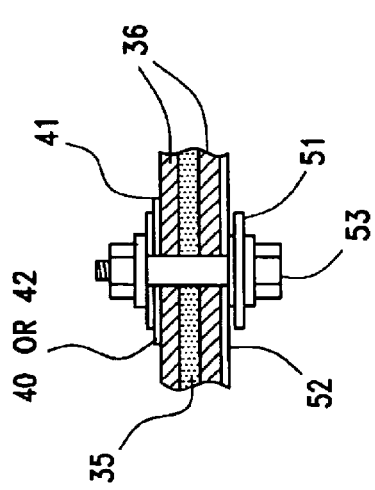
FIG. 6
FIG. 7

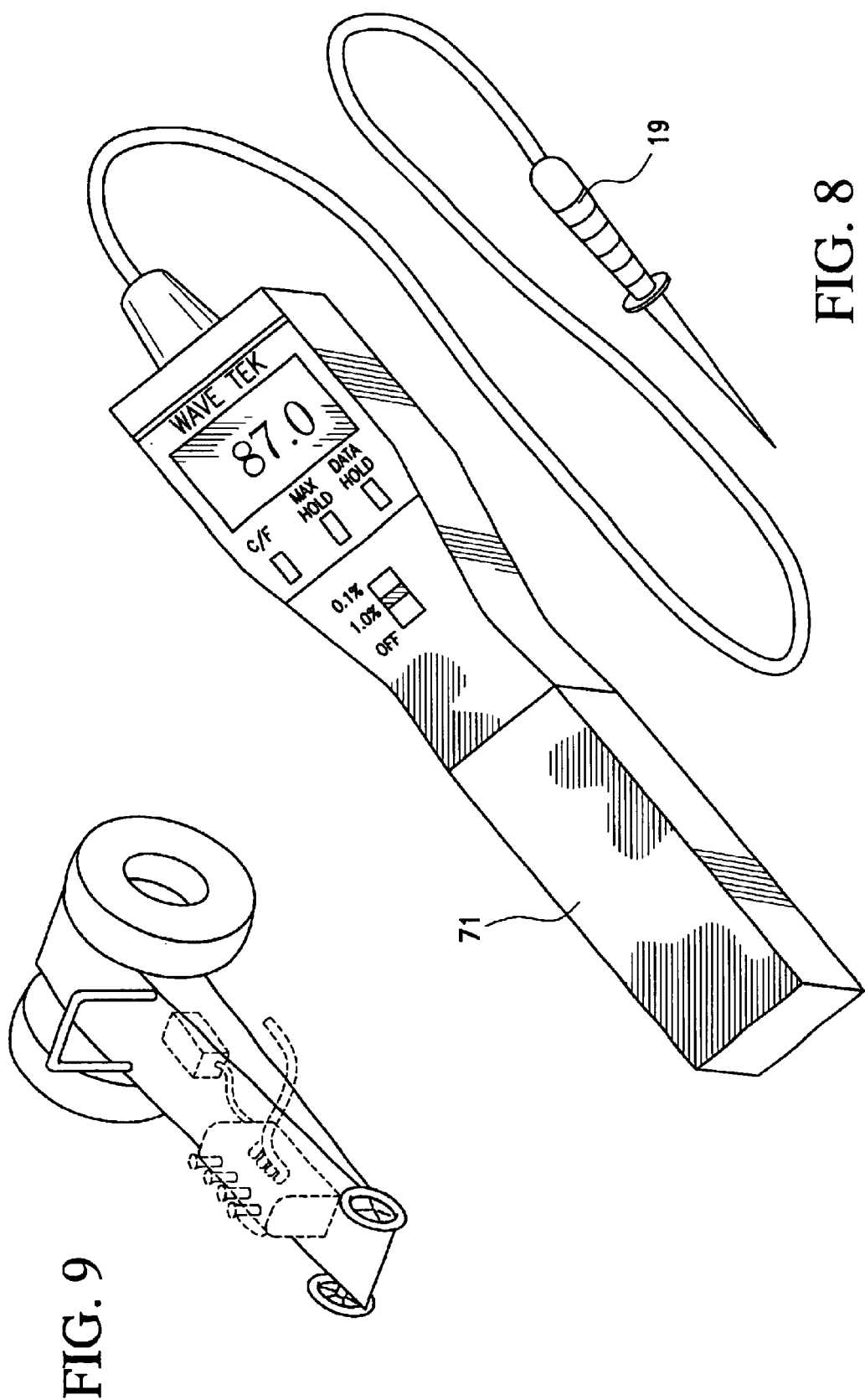

TEMPERATURE CONTROL SYSTEM FOR NITROUS OXIDE PRESSURIZED BOTTLE

FIELD OF THE INVENTION

This invention relates to a temperature control system for a nitrous oxide pressurized storage bottle and more particularly to a temperature control system for maintaining a nitrous oxide pressurized bottle at a preselected temperature and pressure regardless of ambient temperature and extreme temperature variations for injecting nitrous oxide into a motor vehicle engine for power enhancement.

BACKGROUND FOR THE INVENTION

The use of nitrous oxide injection into racing and high performance engines is well known. For example, a U.S. Pat. No. 4,683,843 of Narcia et al. discloses a nitrous oxide fuel injection system for high performance vehicles. The system injects a supply of liquid nitrous oxide to a vehicle engine to provide a sudden burst of power.

The amount of nitrous oxide which is dispensed from a pressurized container during a given time is limited by the capacity and the pressure under which the gas is stored. Therefore, heating the pressurized container or bottle will conduct heat to the nitrous oxide to expand the nitrous oxide and increase the pressure within the container. This allows greater amounts of nitrous oxide to be injected into an engine. For this reason, auto racers such as drag racers often heat the nitrous oxide storage container prior to placing the container into a motor vehicle.

Some methods for heating pressurized containers include holding the flame of a torch in direct contact with the pressurized container and wrapping the container with tape and placing the wrapped container in sunlight which may cause the container to explode. It is also known to apply fitted nylon insulated blankets and a thermostatically controlled 12 VDC heating element to nitrous oxide pressurized storage bottles.

A further approach for heating a pressurized container is disclosed in the U.S. Pat. No. 6,433,316 of Sigety et al. As disclosed therein, a heater assembly includes a container holding portion and a heater housing portion which are separated by a divider and a baffle. At least one aperture and one selectable movable member which substantially covers the aperture when the movable member is in a closed position are provided. When in an open position, the movable member couples with the baffle to form a heating passage to indirectly heat the container.

There is one problem with current methods of heating pressurized nitrous oxide containers. The problem is that such methods are ineffective during extreme temperature variations as for example when the ambient air temperature exceeds 86° F. which is the preferred temperature for which such systems are designed. This optimum desired temperature and subsequent bottle resultant pressure of 900 to 950 psi is needed for the proper consistent operation of the nitrous oxide injection system. Such temperature and pressure are needed in spite of temperature extremes such as temperatures as high as 135° F. inside a vehicle during a hot summer day.

As a result of extreme temperature conditions conventional nitrous oxide systems suffer from large swings in applied power and performance swings in a vehicle's engine. Such performance swings are unacceptable in most racing venues. A further problem associated with such systems is that under extreme conditions, the nitrous oxide bottle temperature may increase to thereby increase the pressure in the bottle beyond the allowable pressure which may cause serious engine damage. A still further problem with current heaters is the excess amount of energy to operate a heating element. For example, such systems may draw between 20 and 35 DC amps in their heating mode. This puts an excessive load on a battery and charging system. Further, the heating element may reach temperatures of 400° F. which will cause serious burns if touched.

Thermo-electric environmental chambers are also known. For example, a portable thermo-electric cooling and heating food appliance is disclosed in the U.S. Pat. No. 4,823,554 of Trachtenberg et al. As disclosed therein, a base unit is provided which can be connected to the cigarette lighter receptacle of a vehicle. The use of a Peltier element and a selective cool or heat control circuit cool or heat the appliance and the foods or liquids contained therein. Such chambers are effective for maintaining food and/or drink at a selected temperature and for maintaining such foods at the chosen temperature after disconnecting the power. However, such systems have not heretofore been applicable for controlling the temperature and pressure of a nitrous oxide pressurized bottle.

It is presently believed that there is a need and a potential commercial market for an improved temperature control system in accordance with the present invention. It is believed that there is a need for such systems that will overcome many of the short comings of the prior art. For example, such systems provide protection and control of nitrous oxide pressurized storage bottles to provide optimum stabilized bottle temperature and pressure for consistent performance regardless of extreme variations in ambient temperature.

Advantages in accordance with the present invention include its ease of installation in a vehicle and a reduced requirement for a high DC current draw from a vehicle battery/charging system in order to operate both heating and cooling functions. In addition, the system uses a Peltier junction thermoelectric heat pump for heating and cooling.

The system in accordance with the present invention also provides a thermostatic temperature control system that can be set to a preferred operating temperature and operate automatically to maintain the operating temperature even during extreme ambient temperatures. Such systems also provide reasonably safe operating temperatures and in a preferred embodiment of the invention provide real time bottle temperature by means of a highly accurate digital temperature gauge.

Other objects and advantages of the present invention will become clear from the following description.

BRIEF SUMMARY OF THE INVENTION

In essence, the present invention contemplates a temperature control system for a nitrous oxide pressurized bottle. The system includes an insulated container which is bounded by a plurality of thermally insulated walls such as polyurethane foam which define an inner compartment. This inner compartment is encompassed by the insulated walls and an insulated cover which is used to close an opening in an upper portion of the compartment. A nitrous oxide pressurized bottle having an outer surface is disposed within the inner compartment and preferably fixed to a base of an inner compartment in a stationary position. Temperature sensing means such as a thermoelectric temperature control means is adapted to sense the surface temperature of a pressurized bottle. In addition, a thermoelectric air conditioning means is provided for heating and cooling the nitrous oxide pressurized bottle to thereby maintain the bottle at a preselected temperature and pressure for injecting nitrous oxide into a motor vehicle engine.

In a preferred embodiment of the invention, the temperature control means for the nitrous oxide pressurized bottle is incorporated in a racing vehicle of the type having an internal combustion engine.

The invention will now be described in connection with the accompanying drawings wherein like reference numerals have been used to identify like parts.

DESCRIPTION OF THE DRAWINGS

FIG. 2 is a prespective view of a heat pump of a type incorporated in the present invention.

FIG. 3 is an exploded perspective view of a Peltier junction thermoelectric heat pump which can generate hot and cold temperatures, a 12 VDC power source, a thermostatic temperature control unit and a main control panel interconnect which are contained in a thermo-electric hot and cold module;

FIG. 6 is a perspective view of the mounting hardware at the bottom of the insulated box;

FIG. 7 is a cross sectional view of a main bottle mounting hardware;

FIG. 8 is a perspective view of a WaveTek battery operated, handheld, real-time all digital temperature control and test probe as used in a preferred embodiment of the invention; and FIG. 9 is a schematic illustration of a racing car with a nitrous oxide pressurized bottle control system therein.

DETAILED DESCRIPTION OF THE PREFERRED EMBODIMENTS OF THE INVENTION

Figure 1:
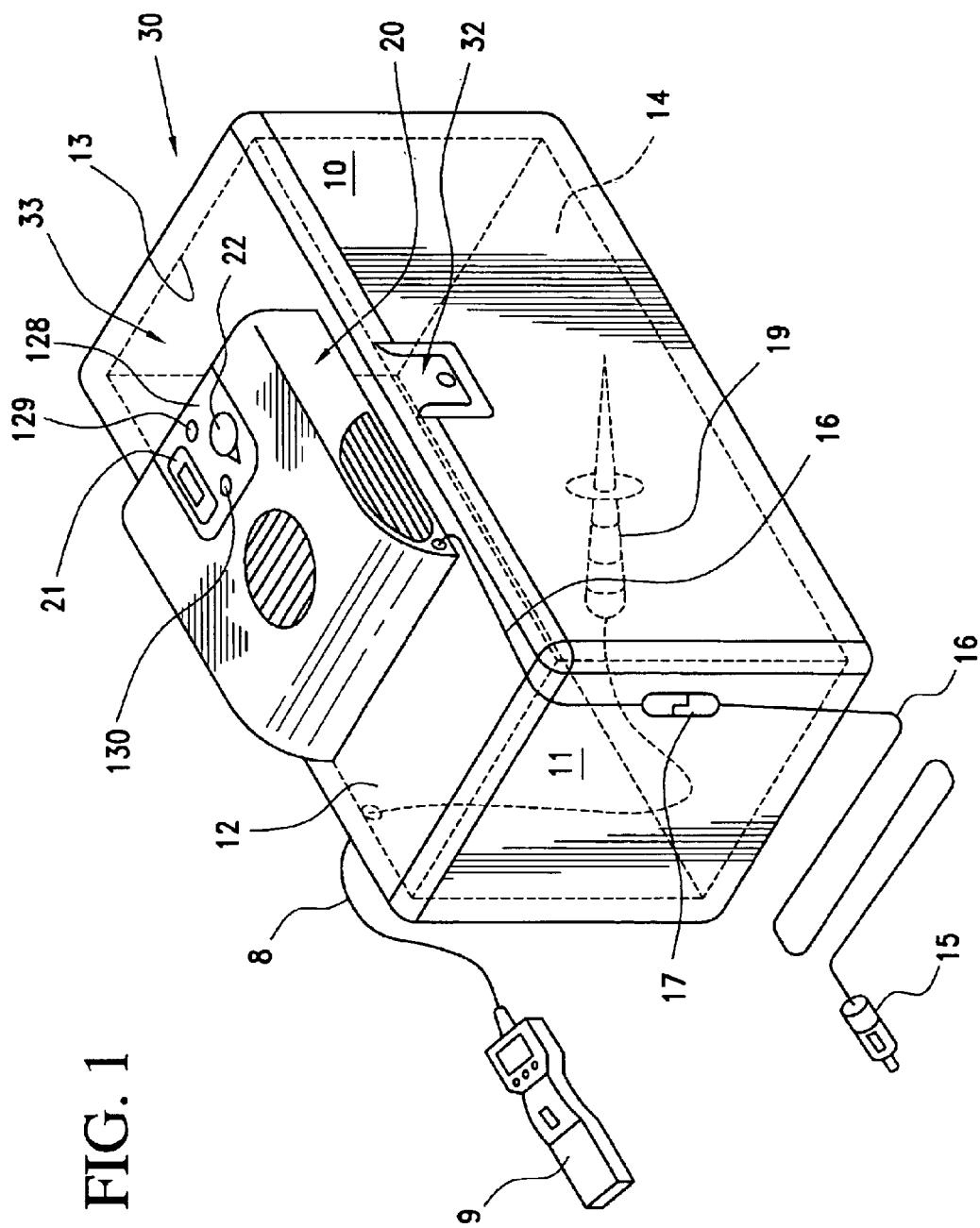
FIG. 1 is a perspective view of an insulated box and a nitrous oxide pressurized bottle control system in accordance with the present invention.
Figures 4, 5:
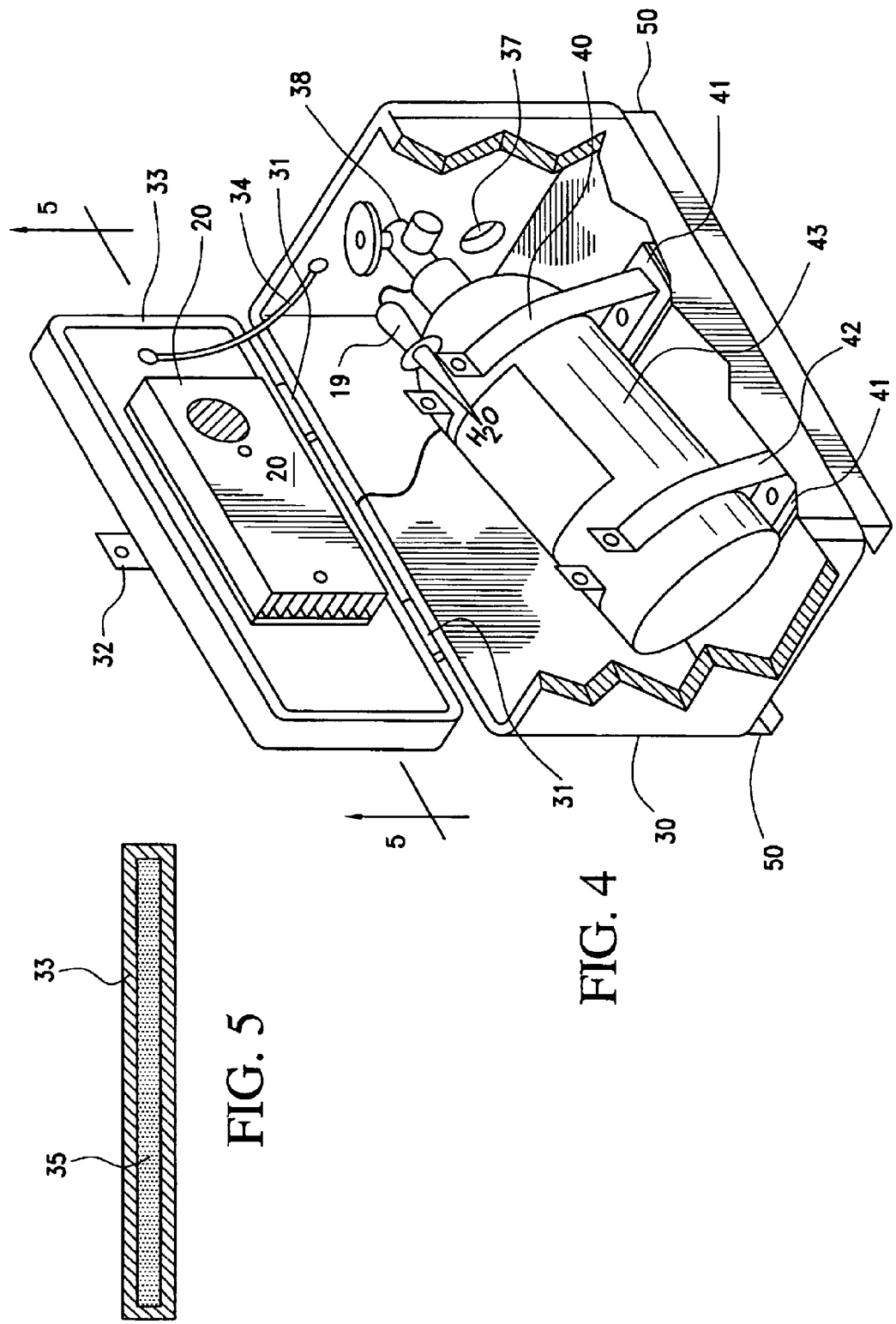
FIG. 4 is a cut away perspective view of a temperature control system for nitrous oxide pressurized bottles with an insulated box lid open to expose the internal components.
FIG. 5 is a cross sectional view of the insulated box lid including the polyurethane foam construction which is essentially the same as the walls and base of the box.

As illustrated in FIG. 1, an insulated container 30 includes a base 14 and four vertical walls 10, 11, 12 and 13 to form a generally box like structure with an open top and a cover 33 to thereby define an inner compartment. The inner compartment is fully enclosed by the base 14, walls 10, 11, 12 and 13 and cover 33 when the cover is in a closed position. In essence, the container 30 is generally similar to a commercially available picnic cooler with laminated polyurethane foam insulation as shown in FIG. 4. The cover 33 is preferably connected to the wall 12 by a pair of hinges 31 (see FIG. 3) in a conventional manner and a conventional latch 32 is used to secure the cover 33 in a closed position. In addition, a safety strap 34 is used to limit the opening of the cover.

As shown in FIGS. 1 and 3, a Peltier junction thermoelectric heat pump 20 is disposed in the inner compartment for heating or cooling the interior compartment and a nitrous oxide bottle 18 (see FIG. 3). A 12 VDC power cord 16 is connected to a fused power output plug 15 and with a source of power (not shown) through a connector 17 which can be disconnected for opening the cover 33 or removing the system from a motor vehicle. Further, a temperature probe 19 which includes a conductor or wire 8 is connected to a digital temperature gauge 9 by means of the connector or wire 8 which passes through the wall 12.

The Peltier junction thermo-electric heat pump is shown more clearly in FIGS. 1, 2 and 2. As illustrated therein, the heat pump 20 includes an on/off switch 21 and a temperature control 22 disposed on a top or upper surface of a housing. The heat pump 20 may be a conventional 50 watt Peltier junction thermoelectric heat pump which is readily available from numerous suppliers. Such devices provide both heat and cold by reversing the polarity of the 12 VDC source which is required to run the heat pump 20. Further, such devices can be used to provide heat or cold while drawing only 2 to 4 amps. The device can also provide temperatures to a maximum of 120° F. and cooling effective to minus 45° F. below outside air temperature.

As shown in FIG. 2 the heat pump 20 includes a 12 VDC fan 121, heat sink 122 and a high density foam gasket 123. The pump 20 also includes a 50 watt Peltier junction wafer 124, an aluminum heat sink block 131 with a thermal safety switch. (Not Shown) As illustrated, the heat pump 20 also includes a source of energy such as a battery 126, a thermoelectric temperature control 127 and a control panel 128 which are shown schematically. In one embodiment, the control panel 128 includes an on/off switch 21 and two LED indicator lights 129 and 130, one of which is red and the other green. The red indicator light indicates heating while the green indicates cooling. In a further embodiment of the invention, the temperature control 127 includes a microprocessor or electronic circuit to automatically control the heat and cold cycles to maintain a preselected temperature. A conventional thermostat control system may be used.

A thermal switch mounted on the aluminum block (Not Shown) 131 acts as a safety device to protect the Peltier junction from over heating during heating operations and is set 65° C. or about 150° F. The heat pump also includes a small 12V motor 140 and fan 141 disposed in a plastic housing 142 which is disposed adjacent to a heat sink 143. The heat sink 143 is separated from the aluminum block 131 which is disposed in the box lid 33.

As shown in FIG. 3, a nitrous oxide pressurized bottle 18 is disposed in the container box 30 at about a 15° angle from the base with the top of the bottle raised and facing forward or front of the vehicle and the bottle should be in this position for proper siphoning of nitrous oxide under hard vehicle acceleration. As shown, the container 30 is fixed in place by a pair of brackets 40 and 42 which are fixed to steel plates 41. The steel plates 41 form a portion of a bottle mounting assembly. The brackets 40 and 42 are bolted to a pair of universal vehicle mounting hardware brackets 50 which are bolted directly to a vehicle (not shown). Since the nitrous oxide pressurized container is fastened to a vehicle by means of the mounting assembly, loads and stress are transferred to the vehicle as opposed to the container 30. The brackets 41 and brackets 40 are also constructed and arranged so that the nitrous oxide pressurized container is disposed at about a 15° angle from the base with the top of the bottle raised. A pair of through holes 37 and 38 are provided for a high pressure safety release valve line associated with the container 18 and for a nitrous oxide feed line to the vehicles nitrous oxide injection system.

FIG. 4 illustrates the construction of each wall, the lid and the base of the container 30. For example, each wall, base and cover of the container are made of a polyurethane core 35 with a hard plastic inner and outer layers 36 which forms a sandwich construction as commonly used in higher quality picnic coolers.

The mounting hardware for a nitrous oxide bottle control system in accordance with the present invention is illustrated in FIGS. 5 and 6. As shown, the insulative container 30 includes a pair of universal vehicle mounting brackets 50 which are disposed along the two opposite bottom sides of the container 30. The brackets 50 may, for example, comprise ¾ inch angle iron which include drilled holes at both ends. The drilled holes allow the brackets 50 to be bolted to the floor of a vehicle trunk or directly to existing passenger seat mounting holes. The container mounting hardware can be made of iron, aluminum, stainless steel or other suitable material which meets the specifications of various vehicle racing regulations.

The brackets 50 are bolted or welded to brackets 51 as for example by bolts 54' (only one shown) through bolt holes 54. Further, the plurality of bolts 53 (only one shown) pass through the vehicle floor, the brackets 51 and steel plates 41 to rigidly fix the container 30 to the vehicle without placing undo stress on the container 30.

As shown in more detail in FIG. 6, the bolt 53 passes through a washer, bracket 51, a base plate 52 as well as the hard plastic layers 36 and polyurethane core 35. The bolt 53 also passes through the steel plate 41 and is held in place by a nut and washer.

A WaveTec battery operated handheld real time digital temperature control 9 and a monitor probe 19 for use in the present invention are shown in FIG. 7. Other suitable controls and probes may also be used in practicing the invention.

FIG. 9 is a schematic illustration of a drag racing vehicle which includes a temperature control system for a nitrous oxide pressurized bottle.

An index of elements follows:
8. Wire
9. Wave Tek Digital Temperature gage
10. Box Front Wall
11. Box Left Side Wall
12. Box Back Wall
13. Box Right Wall
14. Box Bottom
15. Fused Power Output Plug
16. DC Power Cord
17. Connector (found in the middle of power cord 16)
18. Nitrous Oxide Bottle
19. Wave Tek Temperature Probe
20. Peltier Heat Pump Module Assembly
21. Module 20 on/off Switch
22. Temperature Thermostat Control Knob for Module 20
30. Complete Box
31. Box Lid Hinges
32. Box Lid Latch
33. Box Lid
34. Box Lid Safety Strap
35. Box Insulation Foam
36. Box Inner and Outer Plastic Laminate
37. Large Hole for Nitrous Bottle's High Pressure Release Line to Exit Box
38. Small Hole for Nitrous Oxide Feed Line to Exit Box from Pressure Bottle
40. Nitrous Oxide Bottle Mtg. Bracket (Long)
41. Inside Box Steel Support Plate
42. Nitrous Oxide Bottle Mtg. Bracket (Short)
50. Box Mtg. Hardware Brackets
51. Box Mtg. Bracket Support Straps
52. Outside Box Steel Support Plate
53. Main Box Support Bolt Assembly With Spacer
54. Bolt Assembly connecting Items 51 to 50
121. Large 12 DCV Fan
122. Heatsink Outside of Box
123. High Density Foam Gasket
124. 50 Watt Peltier Junction Wafer
126. Battery Power Source
127. Thermo-Electric Temperature Control Circuit Card Assembly
128. Module 20 Control Panel
129. Green LED Light, Indicates when Heat is on
130. Red LED Light, indicates when Heat is on
131. Aluminum Heatsink with 65 Degree C. Safety Switch (Not Shown)
140. Small 12 VDC Motor (Inside of Box)
141. Small Fan (Inside of Box)
142. Plastic Housing Covering Items 140 and 141 (Inside of Box)
143. Heatsink Inside of Box under Item 142

While the invention has been described in connection with its preferred embodiments, it should be recognized that changes and modifications may be made therein without departing from the scope of the appended claims.

What is claimed is:

1. A temperature control system for a nitrous oxide pressurized bottle comprising:

an insulated container bounded by a plurality of thermally insulative walls defining an inner compartment surrounded by said walls and an insulative cover adapted to close said inner compartment;

a nitrous oxide pressurized bottle having an outer surface disposed within said inner compartment and means for mounting said nitrous oxide bottle within said inner compartment in a stationary position with respect to said inner compartment;

temperature sensing means for sensing the temperature of said outer surface of said bottle; and thermo-electric air conditioning means for heating and cooling said nitrous oxide pressurized bottle to thereby maintain said bottle at a preselected temperature and pressure for injecting nitrous oxide into a motor vehicle engine.

2. The temperature control system for a nitrous oxide pressurized bottle according to claim 1 in which said cover is hingedly connected to one of said walls.

3. The temperature control system for a nitrous oxide pressurized bottle according to claim 2 in which said temperature sensing means is in contact with said outer surface of said bottle.

4. The temperature control system for a nitrous oxide pressurized bottle according to claim 3 in which said thermoelectric air conditioning means is a Peltier junction thermoelectric heat pump.

5. The temperature control system for a nitrous oxide pressurized bottle according to claim 4 in which said temperature sensing means is a thermo-electric temperature control unit.

6. The temperature control system for a nitrous oxide pressurized bottle according to claim 1 in which said thermally insulative walls are insulated with a polyurethane foam.

7. The temperature control system for a nitrous oxide pressurized bottle according to claim 6 in which said insulative walls includes a hard plastic outer surface.

8. The temperature control system for a nitrous oxide pressurized bottle according to claim 5 which includes exterior means for indicating the temperature of said surface of said bottle.

9. The temperature control system for a nitrous oxide pressurized bottle according to claim 7 in which said inner compartment includes a base and said bottle includes a valve end, a valve disposed therein and means for opening and closing said valve.

10. The temperature control system for a nitrous oxide pressurized bottle according to claim 9 wherein said pressurized bottle is positioned within said inner compartment with said valve end elevated by about 15° and said means for opening and closing said valve is disposed on a upper opposite side of said bottle from said base.

11. The temperature control system for a nitrous oxide pressurized bottle according to claim 5 which includes microprocessor means for automatically controlling the temperature and pressure of the nitrous oxide in said pressurized bottle.

12. The temperature control system for a nitrous oxide pressurized bottle according to claim 10 as which includes means for fixing said insulated container to a motor vehicle while minimizing mechanical stress on said insulated container.

13. The temperature control system for a nitrous oxide pressurized bottle according to claim 4 which includes connecting means for connecting said Peltier junction thermo-electric heat pump to a motor vehicle 12 VDC power supply and for disconnecting said connecting means for servicing the system.

14. The temperature control system for a nitrous oxide pressurized bottle according to claim 9 which includes fastening means for maintaining said cover in a closed position.

15. In a racing car of the type having an internal combustion engine and means for injecting nitrous oxide into the engine, the improvement comprising a temperature control system for a nitrous oxide pressurized bottle, said system including:
- an insulated container bounded by a plurality of thermally insulative walls defining an inner compartment surrounded by said walls and an insulative cover adapted to close said inner compartment;
- a nitrous oxide pressurized bottle having an outer surface disposed within said inner compartment and means for mounting said nitrous oxide bottle within said inner compartment in a stationary position with respect to said inner compartment;
- temperature sensing means for sensing the temperature of said outer surface of said bottle; and
- thermoelectric air conditioning means for heating and cooling said nitrous oxide pressurized bottle to thereby maintain said bottle at a preselected temperature and pressure for injecting nitrous oxide into a motor vehicle engine.

* * * * *